Aug. 16, 1955   A. A. McDONALD   2,715,438
PELLETIZER APPARATUS
Filed Jan. 26, 1953   3 Sheets-Sheet 1

INVENTOR.
ANGUS A. McDONALD
BY
Oldham & Oldham
ATTORNEYS

Aug. 16, 1955
A. A. McDONALD
2,715,438
PELLETIZER APPARATUS
Filed Jan. 26, 1953
3 Sheets-Sheet 3
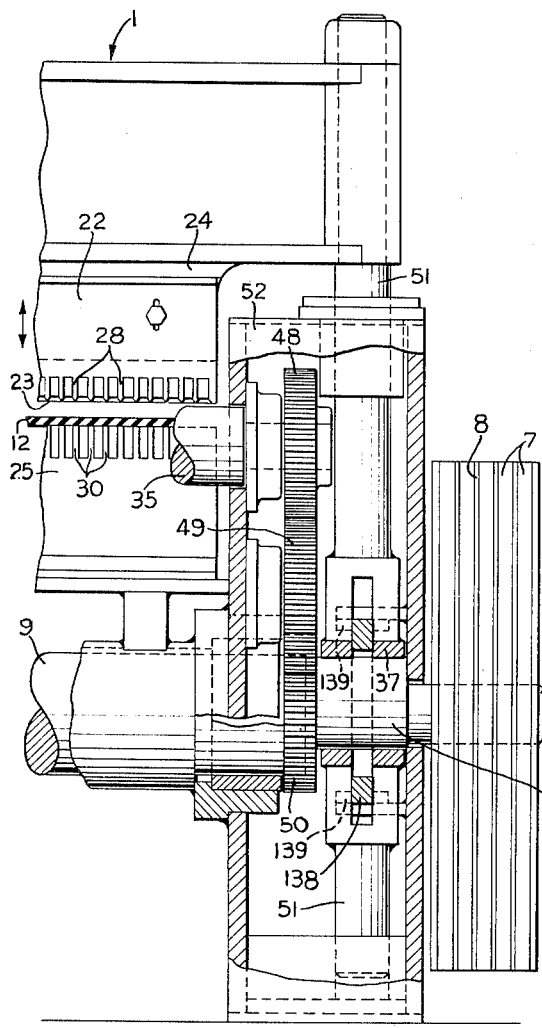
FIG. 3
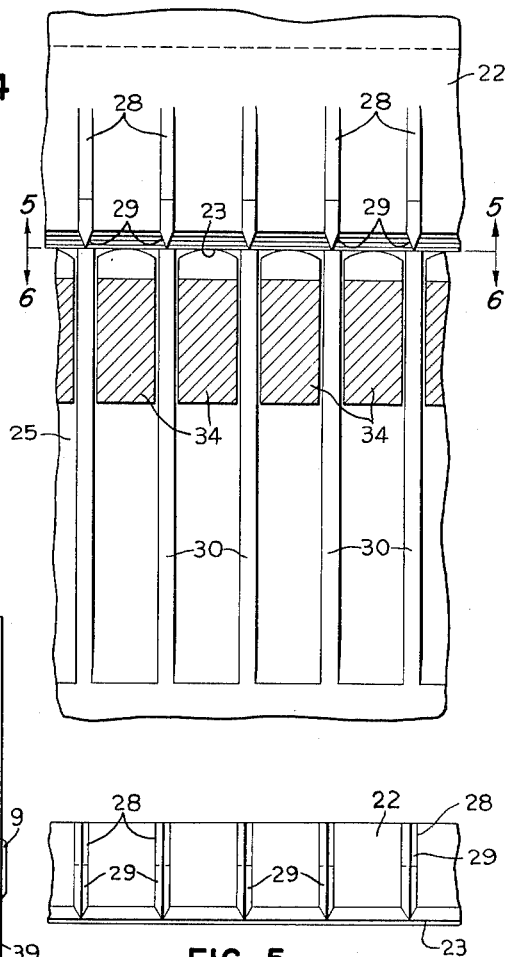
FIG. 4
FIG. 5
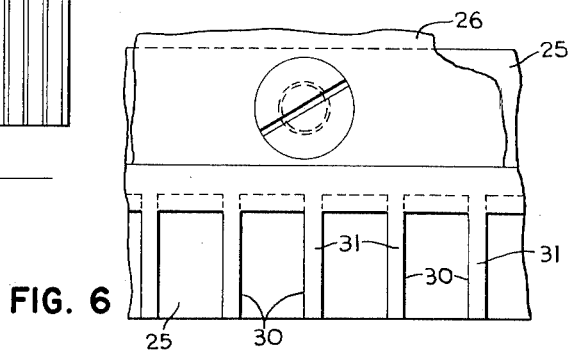
FIG. 6
*INVENTOR.*
ANGUS A. McDONALD
BY *Oldham & Oldham*
ATTORNEYS United States Patent Office 2,715,438
Patented Aug. 16, 1955

2,715,438

PELLETIZER APPARATUS

Angus A. McDonald, Pontiac, Mich., assignor to Baldwin Rubber Company, Pontiac, Mich., a corporation of Michigan Application January 26, 1953, Serial No. 333,040

4 Claims. (Cl. 164—48)

This invention relates to pelletizer apparatus, and especially to apparatus used for cutting sheets of plastic material, such as rubber, into small pieces, or pellets.

Heretofore, there have been various types of pelletizer apparatus provided, but most of such pelletizer apparatus has been particularly adapted for use with extruded lengths of plastic material and have comprised some type of cutter blades that are rotated in association with the extruder head, or means of the apparatus. Other types of pelletizers provided for use with sheets or strips of plastic material, have not been completely satisfactory, insofar as I am aware, because such pelletizers have not cleanly severed the strip of plastic material into the desired small articles, or else the size of the articles or pellets formed has not easily been regulated, or the apparatus has been objectionable for other reasons. Furthermore, most of such pelletizer apparatus provided heretofore has not been of sturdy, relatively inexpensive construction, while the prior apparatus also may require an appreciable amount of costly maintenance work in order to keep the parts of the machine functioning properly.

It is a general object of the present invention to avoid the foregoing and other difficulties with and disadvantages of prior types of pelletizer apparatus, and to provide a pelletizer which is characterized by the relatively simple, sturdy nature of the apparatus and by the fact that the sides and the ends of the pellet are simultaneously cut by the apparatus in forming the pellets.

Another object of the invention is to provide a pelletizer for cutting a strip of plastic material into a number of small pellets wherein the size or length of the pellet so formed can be easily controlled.

A further object of the invention is to provide, in apparatus of the class described, synchronization between knock-out means, and pellet-cutting means, and plastic material feeding means so that the pellets produced are separated from each other and the remainder of the web of plastic material at the instant that the knives are severing such plastic material into a number of small pieces.

Another object of the invention is to provide apparatus for cutting plastic material into a large number of small rectangular pellets of desired lengths rapidly and inexpensively.

The foregoing and other objects and advantages of the invention will be made more apparent as the specification proceeds.

For a better understanding of the invention, attention is directed to the accompanying drawings, wherein one currently preferred embodiment of the principles of the invention is shown, and wherein:

Fig. 3 is a fragmentary front elevation of the apparatus of Fig. 1;

Fig. 4 is a fragmentary vertical section on line 4—4 of Fig. 2;

Fig. 5 is a fragmentary section of a portion of the cutter knife taken on line 5—5 of Fig. 4; and Fig. 6 is a fragmentary section taken on line 6—6 of Fig. 4 and showing a portion of the cutting bar of the apparatus of the invention.

In order to facilitate comparison between the accompanying drawings and the following specification, corresponding numerals are used to identify corresponding parts in the specification and drawings.

Figure 1:
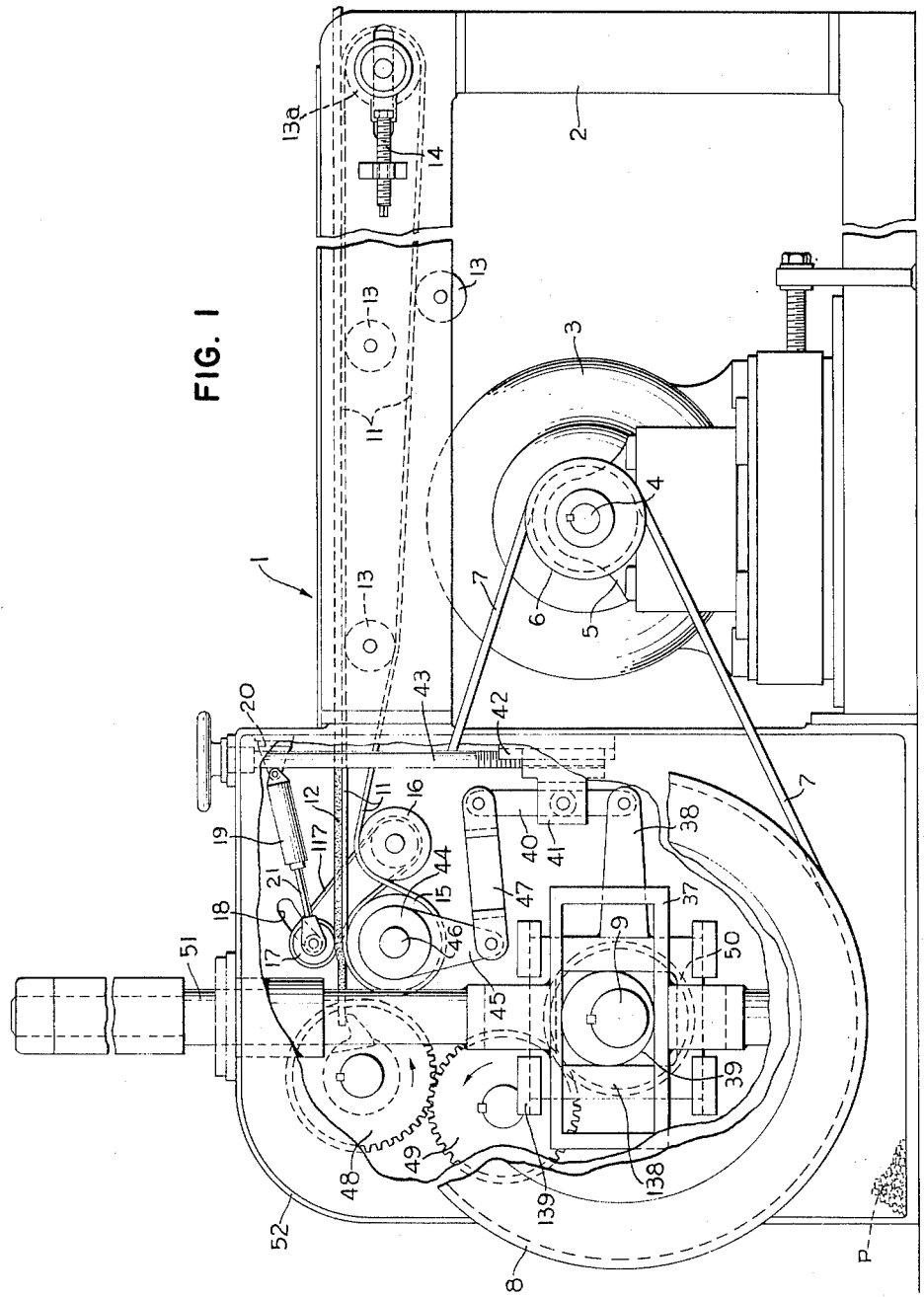
Fig. 1 is a side elevation, with a portion of the cover means of the apparatus removed, of one pelletizer apparatus of the invention.

Generally speaking, the apparatus of the invention relates to a pelletizer, wherein a cutter knife is provided that has a main cutter edge and a plurality of secondary cutter edges extending normally to the said main cutter edge and lying in a plane with such main cutter edge for cutting action, anvil means are present in the apparatus and are shaped similarly to the main and secondary cutter edges for operative engagement therewith, and rotary knock-out means are also present in the apparatus for movement between adjacent secondary cutter edges for removing cut material positioned therein. In addition, the pelletizer comprises means for feeding plastic material to the cutter knife, means for moving the cutter knife, and means for driving the rotary knock-out means so that the knock-out means are engaged with the material being cut at the instant that the cutter knife engages the anvil so that the so-formed pellets are knocked out or removed from the apparatus and the sheet of the plastic material at the instant that a cutting action is being performed thereon.

The pelletizer of the invention is indicated, as a whole, by the numeral 1 and this pelletizer 1 includes a frame 2 which is shown as having a conventional electric motor 3 adjustably positioned thereon. The motor 3 has a drive shaft 4 extending therefrom transversely of the frame 2, which drive shaft 4 is journaled in suitable bearings 5 positioned adjacent each end of the shaft 4. The drive shaft 4 carries suitable pulleys 6 on each end thereof, which pulleys engage with V-belts or similar drive means 7 that engage a fly-wheel 8, usually positioned at each lateral margin of the frame 2. These fly-wheels 8 are carried by a shaft 9 journaled in the frame 2 and extending transversely thereof for controlling the drive and operation of the pelletizer 1.

*Plastic material feeding means*

Preferably, the apparatus includes a conveyor belt 11, to which a sheet of plastic material 12 is fed or supplied in any convenient manner. Of course, the apparatus is adapted to function upon any usual type of plastic material, such as rubber, rubber-like materials, synthetic rubber materials, and other plastic substances. The conveyor belt 11 is positioned on a plurality of drive rolls 13 journaled on an upper portion of the frame 2. The forward end of the conveyor belt 11 is positioned on a special roll 13A which is operatively connected to a threaded adjustment screw 14 carried by the frame 2 so that the position of such roll 13A may be varied for tensioning the conveyor belt 11. The end of the conveyor belt 11 used for depositing the plastic material 12 into the cutting or pelletizing portion of the apparatus of the invention is carried by a conveyor feed or drive roll 15, and the conveyor belt 11 is brought into engagement with a large portion of the periphery of the drive roll 15 by an additional guide roll 16 positioned adjacent to drive roll 15 and suitably positioned on the frame 2. The conveyor belt 11 is intermittently driven, as explained hereinafter in more detail.

In order to retain the plastic material or sheet 12 in firm engagement with the conveyor belt 11 for movement therewith, a pressure roll 17 is positioned immediately above the drive roll 15 for engaging any plastic material on the conveyor belt and for pressing the plastic material against such drive roll 15. Such pressure roll 17 may have the ends of its positioning shafts journaled in or positioned by suitable arcuate slots 18 formed in a portion of the frame 2 so that the pressure roll 17 may be withdrawn from engagement with the conveyor belt 11 and means thereon when it is desired to thread plastic material through the pelletizer 1, or for any other reason. The pressure roll 17 has its position and pressure exerted thereby controlled by suitable control cylinders 19, that are secured at one end to brackets 20 on the frame 2 and which engage the shaft of the pressure roll 17 by pistons 21. Any suitable means (not shown) are provided for controlling the operation of the cylinders 19 and thus controlling the position of the pressure roll 17 and establishing the desired pressure thereon.

*Knife, anvil and pellet knock-out means*

Figure 2:
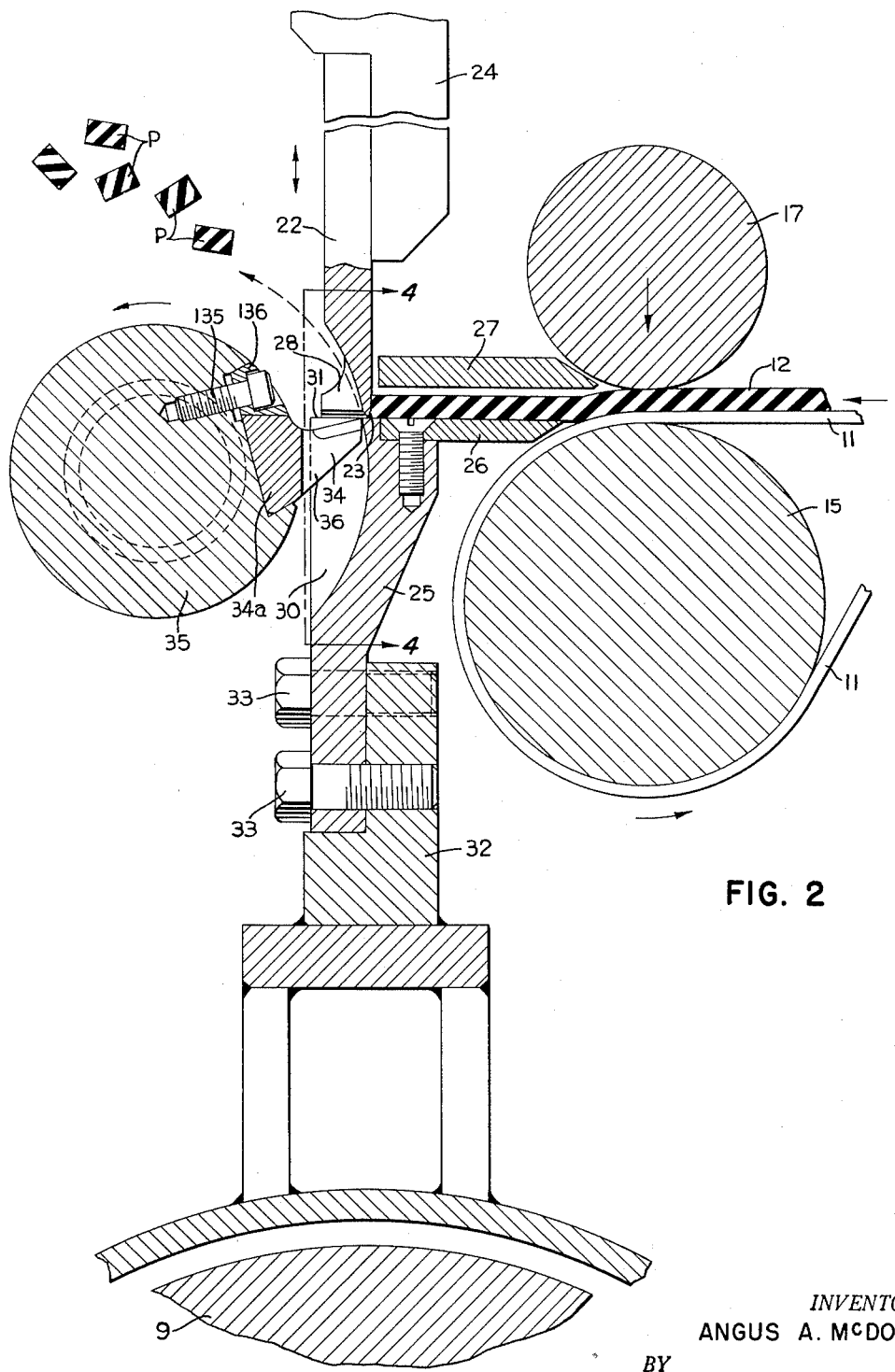
Fig. 2 is an enlarged vertical section through the apparatus of the invention at the cutting knife and rotary knockout finger portion of the apparatus.

Figs. 2 and 4 through 6 best show the detail of the cutter and knock-out means of the apparatus and such means include a knife 22 that has a main knife edge 23 extending transversely of the frame 2. The knife 22 is suitably carried by a support 24, as hereinafter more fully explained, for reciprocation to and from engagement with an anvil 25 for cutting action on any of the plastic material 12 fed between the main knife 23 and the upper or cutting surface of the anvil 25, as indicated in Fig. 2.

In moving to the knife 22, the sheet of plastic material 12 passes over a guide plate 26, Fig. 2, which is positioned close to the conveyor belt 11 as it passes over the drive roll 15 and deposits the plastic material 12 on such guide plate 26.

Usually, it is desirable that the pressure roll 17 be positively driven to aid in passage of the plastic material 12 through the pelletizer 1 so that a connector chain 117 is shown suitably connecting the shafts of the guide roll 16 and the pressure roll 17 so that positive drive movement is provided for the pressure roll 17 from any rotary movement of the roll 16.

It is an important feature of the invention that the pelletizer 1 is adapted to cut the lateral portions or margins of any pellet being cut from the plastic material 12 as it passes through the apparatus of the invention. In order to achieve this end, the knife 22 is provided with a plurality of transversely spaced trailing flanges 28 extending normaly from the rear surface of such knife 22, as is shown in Figs. 2, 4 and 5 of the drawings. Such flanges 28 terminate in secondary knife edges 29 which are positioned normally with relation to the main knife edge 23, but all of which lie in a cutting plane defined by such main and secondary knife edges. This cutting plane would be positioned normal to the vertical axis of the knife 22 (as it is positioned in Fig. 2). The anvil 25 is likewise provided with a plurality of transversely spaced partition walls, or flanges 30 extending normally from the rear surface of such anvil 25 and spaced similarly to the flanges 28 of the knife 22 so that a plurality of secondary or trailing anvils 31 are provided on a trailing portion of the anvil 25 for coordination with the secondary knife edges 29 to provide cutting actions on the lateral margins of pellets being produced in the apparatus of the invention.

The anvil 25 is fixedly positioned on the frame 1 by any suitable means with the anvil 25 usually being removably affixed to a sub-frame 32 by cap screws 33 or other similar means. The sub-frame 32 is supported on the apparatus 2 in any desired manner (not shown).

Pellets, indicated by the letter P, cut from the plastic material 12 are shown being thrown from the cutting means of the apparatus by suitable knock-out fingers 34. As indicated by Fig. 4, normally, such knock-out fingers 34 are of a width so as to fit snugly intermediate a pair of adjacent flanges 30 provided on the anvil 25. The knock-out fingers 34 are usually integral with a carrier bar 34ª that is secured to a shaft 35 by conventional means, such as cap screws 135 and a wedge bar 136. The shaft 35 is journaled in the frame 2 and extends transversely thereof. The knockout- fingers 34 are made more wear-resistant at the leading or upper end thereof by use of carbaloy inserts 36 that are suitably secured to the operative or leading edge portion of the knock-out fingers 34, as indicated in Fig. 2.

*Drive means*

The conveyor 11, knife 22 and knock-out fingers 34 are all suitably driven in synchronized relationship from the flywheels 8 and the shaft 9 positioning such wheels. The plastic sheet material 12 is advanced, of course, when the knife is separated from the anvil. These drive means are shown as including a Scotch yoke 37 which has a bracket 38 operatively associated therewith and being provided with only lateral movement in the yoke 37 by the drive means connecting thereto. The yoke 37 is engaged with the shaft 9 through a cam 39 secured to or integral with the shaft 9. The bracket 38 is carried by a slide frame 138 which engages the cam 39 on opposite sides thereof. Slide supports 139 secured to the frame 2 position the slide frame 138.

The bracket 38 is shown as pivotally engaged with one end of an arm 40 which is journaled in a bracket 41. This bracket 41 is adjustably carried by a slide 42 which is suitably secured to the frame 2. The position of the bracket 41 on the slide 42 is varied by means of a control screw 43, journaled on the frame 2 and threadably engaging the bracket 41 for varying its vertical position for controlling the amount of movement of the conveyor belt 11 with each actuation thereof. Intermittent drive is transmitted to the drive roll 15 by means of a conventional over-running, or ball type, clutch 44 that connects a drive-arm 45 for the clutch to the shaft 46 on which the drive roll 15 is positioned. A link 47 connects the clutch arm 45 to the arm 40 for transmittal of drive actuations to the over-running clutch 44. Thus, on each rotation of the control shaft 9, the shaft 46 of the drive roll 15 is given a forward movement of desired length for feed of the plastic sheet 12 into the cutting apparatus of the invention.

The shaft 35, on which the knock-out fingers 34 are positioned, usually is driven by a gear 48 on the shaft meshing with a gear 49 journaled on the frame 2 and meshing with a gear 50 carried by the drive shaft 9 journaled on the frame 2.

The support 24 for the knife 22 is secured to uprights or posts 51 journaled in the frame 2 on each lateral margin thereof for vertical reciprocating movement. These posts 51 suitably engage the Scotch yoke 37 so that such Scotch yoke gives the support posts 51 vertical reciprocating movement (when considering that the upper stretch of the conveyor belt 11 is operating in a horizontal direction). In all events, the Scotch yoke and associated means will give the knife 22 reciprocating movement towards and from the associated anvil, and likewise give intermittent drive action of desired length to the drive means provided for the conveyor belt 11. Then it is only necessary to position the knock-out fingers 34 in predetermined arcuate relation to the Scotch yoke, or other drive means provided, for controlling the operation of the knife and conveyor so that such knock-out fingers are in the position shown in Fig. 2 at the instant the knife 22 is brought down into operative relationship with the anvil.

It will be realized that other types of conventional means may be provided for controlling and synchronizing the drive of the various portions of the pelletizer 1 in place of the Scotch yoke and associated means shown in the drawings for this purpose.

The pelletizer 1 includes a cover 52 over at least some of the operating mechanism such as the gears 48, 49 and 50 and associated parts. Additional cover means (not shown) may be provided over the rear portion of the apparatus for enclosing the knife 22, anvil 25 and knock-out fingers 34. Thus, as pellets P are formed from the sheet of plastic material 12, the knock-out fingers will throw such pellets up against such additional cover (not shown) from which the pellets will drop down into a lower portion of the apparatus, as indicated in Fig. 1. From the lower portion of the pelletizer, any suitable conveyor means (not shown) may be used for leading the pellets produced from the apparatus and conveying them to a desired point.

It should be noted that the knock-out fingers 34 aid in severing or pulling the pellets from the remainder of the plastic material. That is, even though the knife 22 and anvil 25 have good sharp contact, sometimes the plastic material may not be completely severed by the main and secondary knife edges engaging the associated portions of the anvil. Thus, as the knock-out fingers pass the adjacent portions of the knife and anvil, at the same instant that such means are operatively associated, the knock-out fingers will aid, or complete, the cutting action of the knife and physically remove the pellets from any engagement whatsoever with the remaining original sheet of plastic material.

From the foregoing description, it will be seen that the pelletizer of the invention is of a relatively uncomplicated construction, and that the knife and anvil means provided are of sturdy construction. Hence, maintenance of the pelletizer will be reduced to a minimum. The knock-out fingers of the invention are of sturdy construction and have special long-wearing inserts in the wear surfaces thereof so that no maintenance is normally required on such knock-out fingers even after lengthy periods of service. A large number of pellets of a desired size can be rapidly and inexpensively produced by the pelletizer 1 so that it is contended that the objects of the invention have been achieved.

While one complete embodiment of the invention has been disclosed herein, it will be appreciated that modifications of this particular embodiment of the invention may be resorted to without departing from the scope of the invention as defined in the appended claims.

I claim:

1. A pelletizer for plastic materials comprising means for intermittently advancing a sheet of material, means for controlling the length of material feed per advancement, an elongate anvil having a flat anvil surface over which the sheet of material passes, said anvil having a plurality of evenly spaced partition walls on the trailing surface thereof terminating in trailing anvil surfaces in the plane of said flat anvil surface, a knife for contacting said flat anvil surface to cut material thereon, said knife having evenly spaced trailing partition flanges thereon with cutter edges on the ends thereof, said trailing partition flanges and cutter edges thereon being positioned to engage said trailing anvil surfaces for cutting action when said knife engages said anvil, means for reciprocating said knife to and from engagement with said anvil, a driven shaft, and a plurality of rigid knock-out fingers carried by said shaft for rotation intermediate said partition walls to knock out particles of material cut from the sheet of material by said knife, the operation of said knock-out fingers being correlated with the action of said knife for movement past said cutter edges when said knife is engaged with said anvil.

2. A pelletizer for plastic materials comprising means for intermittently advancing a sheet of plastic material, an elongate anvil over which the sheet of material passes and having a flat anvil surface thereon, said anvil having a plurality of partition walls on the trailing surface thereof terminating in trailing anvil surfaces in the plane of said flat anvil surface, a knife for contacting said flat anvil surface to cut material thereon, said knife having trailing partition flanges thereon with cutter edges on the ends thereof, said trailing partition flanges being positioned to engage said partition walls for cutting action when said knife engages said anvil, means for reciprocating said knife to and from engagement with said anvil, and a plurality of rigid knock-out fingers for rotation intermediate said partition walls to knock out particles of material cut from the sheet of material by said knife, said knock-out fingers substantially completely filling the space between said partition walls for possible removal of materials positioned therein, the operation of said knock-out fingers being correlated with the action of said knife for movement past said cutter edges when said knife is engaged with said anvil.

3. A pelletizer for plastic materials comprising means for intermittently advancing a sheet of material, an elongate anvil over which the sheet of material passes, said anvil having a plurality of evenly spaced partition walls on the trailing surface thereof terminating in trailing anvil surfaces in the plane of said flat anvil surface, a knife for contacting said flat anvil surface to cut material thereon, said knife having trailing partition flanges thereon with cutter edges on the ends thereof, said trailing partition flanges being positioned to engage said partition walls for cutting action when said knife engages said anvil, means for reciprocating said knife to and from engagement with said anvil, a driven shaft, a plurality of rigid knock-out fingers carried by said shaft for rotation intermediate said partition walls to knock out particles of material cut from the sheet of material by said knife, and means connecting to said driven shaft and controlling said knife reciprocation means and said advancing means to correlate the action thereof.

4. A pelletizer for plastic materials comprising an elongate anvil over which a sheet of material passes, said anvil having a plurality of evenly spaced partition walls on the trailing surface thereof terminating in trailing anvil surfaces in the plane of said flat anvil surface, a knife for contacting said flat anvil surface to cut material thereon, said knife having evenly spaced trailing partition flanges thereon with cutter edges on the ends thereof, said trailing partition flanges being positioned to engage said partition walls for cutting action when said knife engages said anvil, means for reciprocating said knife to and from engagement with said anvil, roller means for pressing the sheet of material into engagement with said anvil, means for intermittently advancing the sheet of material when said knife is out of engagement with said anvil by positive rotation of said roller means, a driven shaft, and a plurality of rigid knock-out fingers carried by said shaft for rotation intermediate said partition walls to knock out particles of material cut from the sheet of material by said knife, the operation of said knock-out fingers being correlated with the action of said knife for movement past said cutter edges when said knife is engaged with said anvil.

References Cited in the file of this patent

UNITED STATES PATENTS

| | | |
|---|---|---|
| 721,010 | Brown | Feb. 17, 1903 |
| 1,146,554 | Clark | July 13, 1915 |
| 1,332,848 | Kent | Mar. 2, 1920 |
| 1,957,078 | Robillard | May 1, 1934 |
| 2,236,336 | Easton | Mar. 25, 1941 |
| 2,614,631 | Bone | Oct. 21, 1952 |